US006668977B2

(12) United States Patent
Arsenault

(10) Patent No.: US 6,668,977 B2
(45) Date of Patent: Dec. 30, 2003

(54) REMOVABLE AND REPLACEABLE TREE STAND

(75) Inventor: Thomas Arsenault, Boxford, MA (US)

(73) Assignee: TS Treestands, LLC, Stoneham, MA (US)

( * ) Notice: Subject to any disclaimer, the term of this patent is extended or adjusted under 35 U.S.C. 154(b) by 0 days.

(21) Appl. No.: 10/140,560

(22) Filed: May 7, 2002

(65) Prior Publication Data
US 2003/0209388 A1 Nov. 13, 2003

(51) Int. Cl.[7] .............................. E04G 3/00; E04G 1/36
(52) U.S. Cl. ....................... 182/187; 182/128; 108/152
(58) Field of Search .................................. 182/187, 150, 182/188, 128, 135, 113, 136, 82; 108/152; 248/218.4; 211/107, 112, 110, 111; 297/217, 463

(56) References Cited

U.S. PATENT DOCUMENTS

| 58,712 A | * | 10/1866 | Beckwith ..................... 108/152 |
| 92,109 A | * | 6/1869 | Shirey et al. ................ 108/152 |
| 488,247 A | * | 12/1892 | Loebs .......................... 211/107 |
| 860,359 A | * | 7/1907 | Dudley ........................ 182/187 |
| 1,197,999 A | * | 9/1916 | Beckett .................. 182/128 X |
| 1,231,823 A | | 7/1917 | Weasler |
| 1,683,944 A | * | 9/1928 | Balch .......................... 108/152 |
| 1,759,966 A | | 5/1930 | Swinney |
| 2,066,984 A | * | 1/1937 | Lamb .......................... 182/187 |
| 2,074,586 A | | 3/1937 | Heinrich et al. .............. 304/28 |
| 3,116,808 A | | 1/1964 | Riley ........................... 182/29 |
| 3,332,654 A | * | 7/1967 | Jacobson ..................... 211/107 |
| 3,749,200 A | | 7/1973 | Meyer ......................... 182/187 |
| 4,056,902 A | | 11/1977 | Ziegler, Jr. ...................... 52/73 |
| 4,484,660 A | | 11/1984 | Baynum ...................... 182/187 |
| 4,699,248 A | | 10/1987 | Roy ............................ 182/116 |
| 4,730,700 A | | 3/1988 | Miller et al. ................. 182/187 |
| 4,784,239 A | | 11/1988 | Kirkman ..................... 182/187 |
| 5,348,119 A | | 9/1994 | Filkins ........................ 182/187 |
| 5,522,186 A | | 6/1996 | Jarman .......................... 52/73 |
| 5,853,066 A | * | 12/1998 | Gohn .......................... 182/187 |
| 6,264,000 B1 | | 7/2001 | Johnson ...................... 182/136 |

FOREIGN PATENT DOCUMENTS

DE          445 797         6/1927

OTHER PUBLICATIONS

Cabela's Archery 2001 Catalog (Cabela's, Inc., Sidney, Nebraska, 2001) pps 72–91, no month available.

* cited by examiner

Primary Examiner—Hugh B. Thompson
(74) Attorney, Agent, or Firm—Foley Hoag LLP

(57) ABSTRACT

Tree stands that may be removeably and replaceably attached to tree trunks having a wide variety of diameters are described. Tree stands that provide 360° platforms are also described. According to one exemplary embodiment, a tree stand may include a platform, a collar that may be removeably and replaceably attached to a tree trunk and that may include multiple first receiving portions, and multiple support bars supporting the platform on the collar. The multiple support bars may be removeably and replaceably insertable into the multiple first receiving portions.

25 Claims, 9 Drawing Sheets

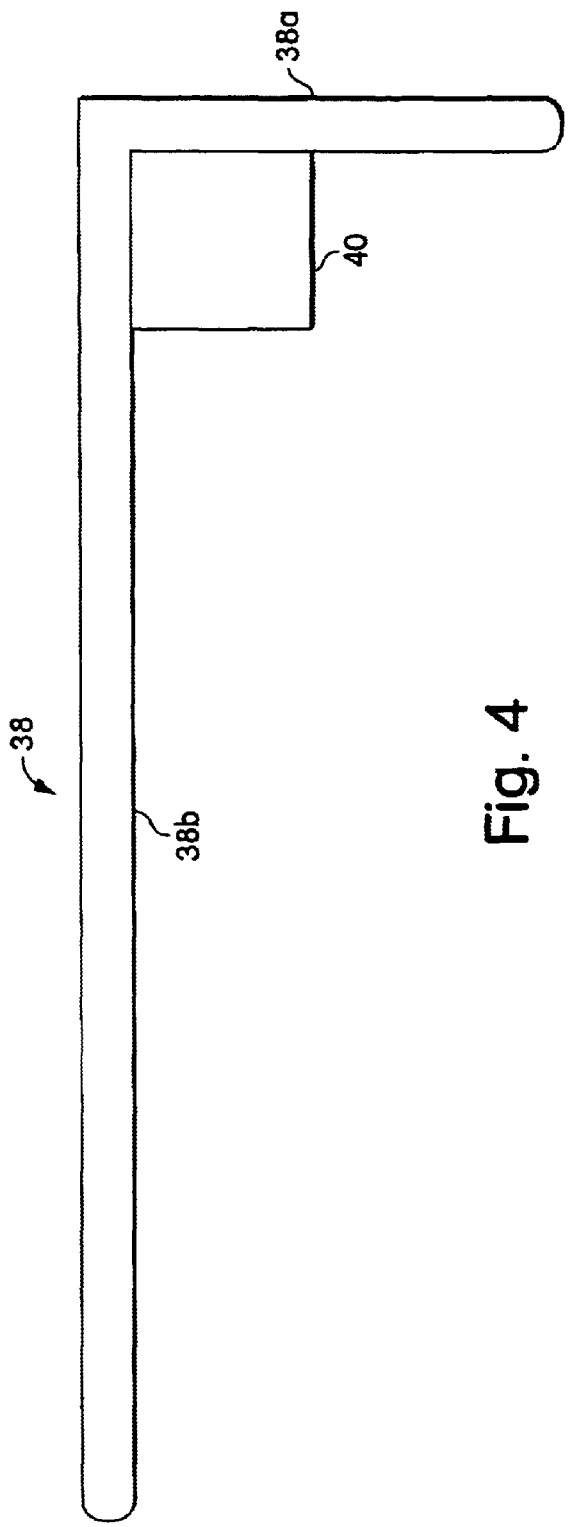
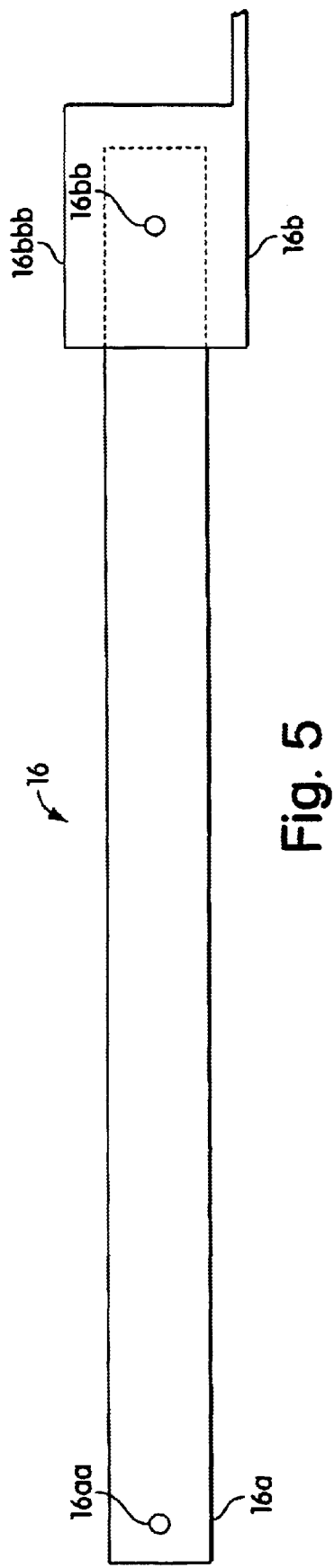

REMOVABLE AND REPLACEABLE TREE STAND

BACKGROUND

A tree stand is a perch that may be attached to a tree, typically the tree trunk, for observing and hunting wildlife, pruning tree limbs, picking fruit, and other related activities.

A variety of conventional tree stands are presently available. Many conventional tree stands physically confine a perched observer to a specific orientation relative to the tree and thus inhibit the degree of maneuverability and field of view of the perched observer.

SUMMARY

Disclosed herein are tree stands that may be removeably and replaceably attached to tree trunks having a wide variety of diameters. Also disclosed herein are tree stands that may provide 360° platforms.

According to one exemplary embodiment disclosed herein, a tree stand may include a platform, a collar being removeably and replaceably attachable to a tree trunk and that may include multiple first receiving portions, and multiple support bars supporting the platform on the collar, at least one of the multiple support bars being removeably and replaceably insertable into at least one of the multiple first receiving portions.

In one aspect, the platform may span a planar angle of at least approximately 180°0.

In another aspect, the platform may include at least two platform portions being removeably and replaceably attachable to each other.

In another aspect, the platform may include an inner sidewall facing the tree trunk, an outer sidewall facing away from the tree trunk, and at least one platform portion pivotally mountable to at least one of the inner sidewall and the outer sidewall.

In another aspect, the platform may include multiple support ribs and expanded metal flooring disposed on the multiple support ribs.

In another aspect, the platform may include multiple second receiving portions, at least one of the multiple support bars being removeably and replaceably insertable into at least one of the multiple second receiving portions.

In another aspect, the collar may include two collar portions that are removeably and replaceably attachable to each other. The two collar portions may be hingedly attachable at a first end and releasably fastenable at a second end.

In another aspect, the collar may include an outer surface facing away from the tree trunk and multiple apertures extending inward from the outer surface. The collar may further include multiple mated fasteners for removeably and replaceably attaching the collar to the tree trunk.

In another aspect, at least one of the multiple mated fasteners may include a blunt face facing the tree trunk.

In another aspect, at least one of the multiple support bars may include an L-shape including a base and an elongated portion oriented substantially perpendicular to the base, the base being removeably and replaceably insertable into at least one of the multiple first receiving portions.

In another aspect, the elongated portion may be removeably and replaceably insertable into at least one of the multiple second receiving portions.

According to another exemplary embodiment disclosed herein, a tree stand may include multiple support legs. At least one of the multiple support legs may be pivotally mountable at a first end to the platform. At least one of the multiple support legs may be removeably and replaceably attachable at a second end to the tree trunk.

According to another exemplary embodiment disclosed herein, a tree stand may include a 360° platform, a collar being removeably and replaceably attachable to a tree trunk and that may include multiple receiving tubes, and multiple support bars supporting the platform on the collar. At least one of the multiple receiving tubes may be welded to an outer surface of the collar that faces away from the tree trunk. At least one of the multiple support bars may have an L-shape and may include a base and an elongated portion oriented substantially perpendicular to the base. The base may be removeably and replaceably insertable into at least one of the multiple receiving tubes.

Also disclosed herein are collars for removeably and replaceably attaching tree stands to tree trunks.

According to one exemplary embodiment disclosed herein, a collar may include a sidewall being removeably and replaceably attachable to a tree trunk and that may include multiple first receiving portions.

In one aspect, the sidewall may include two sidewall portions that may be hingedly attachable to each other at a first end and releasably fastenable to each other at a second end.

In another aspect, the sidewall may include multiple apertures extending inward from an outer surface facing away from the tree trunk and multiple mated fasteners for removeably and replaceably attaching the collar to the tree trunk.

In another aspect, the apertures may be disposed at substantially equidistant intervals around the sidewall.

In another aspect, the sidewall may include an inner surface facing the tree trunk, and the collar may include multiple nuts attached to the inner surface and surrounding the multiple apertures.

BRIEF DESCRIPTION OF THE DRAWINGS

FIG. 4 is a side view of a support bar shown in FIGS. 1A and 1B.

FIG. 5 is a side view of a support leg shown in FIGS. 1A and 1B.

DETAILED DESCRIPTION

Figure 1A:
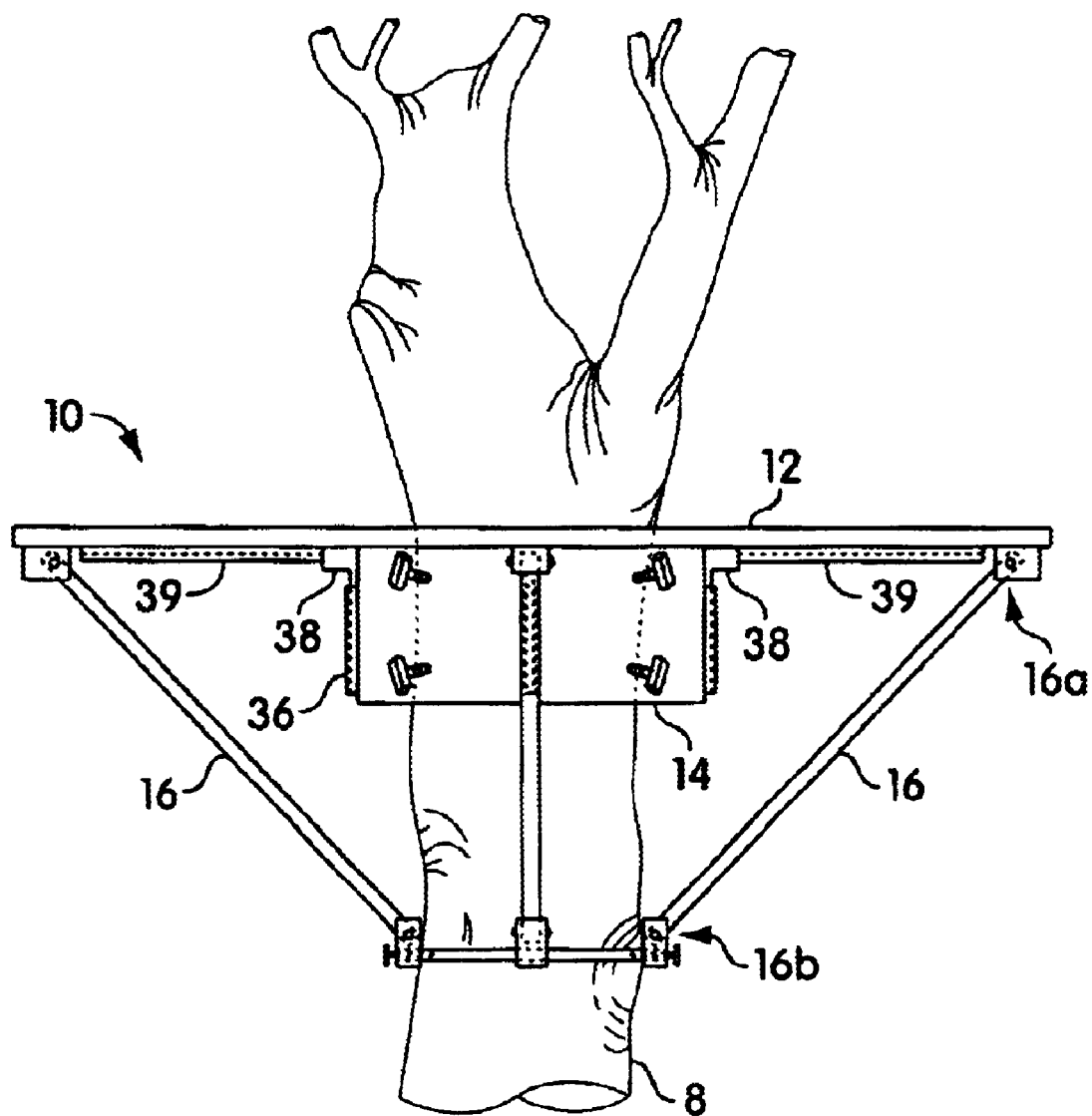
FIG. 1A is a side view of an exemplary embodiment of a tree stand disclosed herein.
Figure 1B:
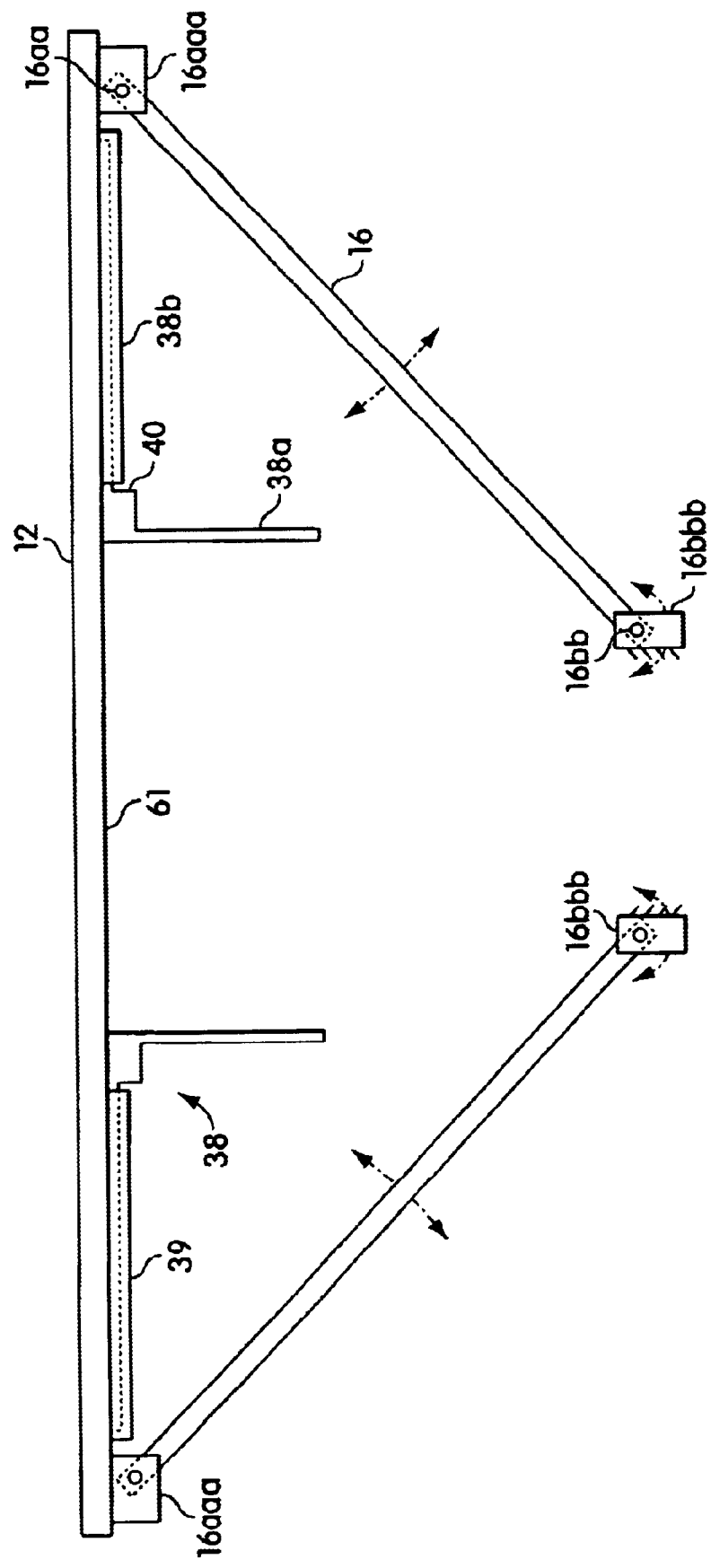
FIG. 1B is a partial side view of the tree stand shown in FIG. 1A, illustrating the support bars and support legs shown in FIG. 1A.

An exemplary embodiment of a tree stand disclosed herein is shown in FIGS. 1A and 1B. As shown in FIG. 1A, a tree stand 10 may include a platform 12, a collar 14 that may include multiple first receiving portions 36, and multiple support bars 38 that may be removeably and replaceably inserted into the first receiving portions 36. As shown, the collar 14 is attached to a tree trunk 8, and the support bars 38 support the platform 12 on the collar 14. Optionally, as shown, the platform 12 may include multiple second receiving portions 39 for removeably and replaceably receiving the multiple support bars 38. Optionally, as shown, the tree stand 10 may include support legs 16 further supporting the platform 12 on the tree trunk 8. Optionally, as described below, the platform 12 may span a planar angle of up to 360°. Potentially advantageously, the tree stand 10 may be removeably and replaceably attached to the tree trunk 8 at any desired height, and may be removeably and replaceably attached to tree trunks 8 having a wide variety of diameters by adjusting the size of the collar 14, as described below. Also potentially advantageously, the tree stand 10 permits unobstructed movement and observation about the planar extent of the platform 12.

Figure 2A:
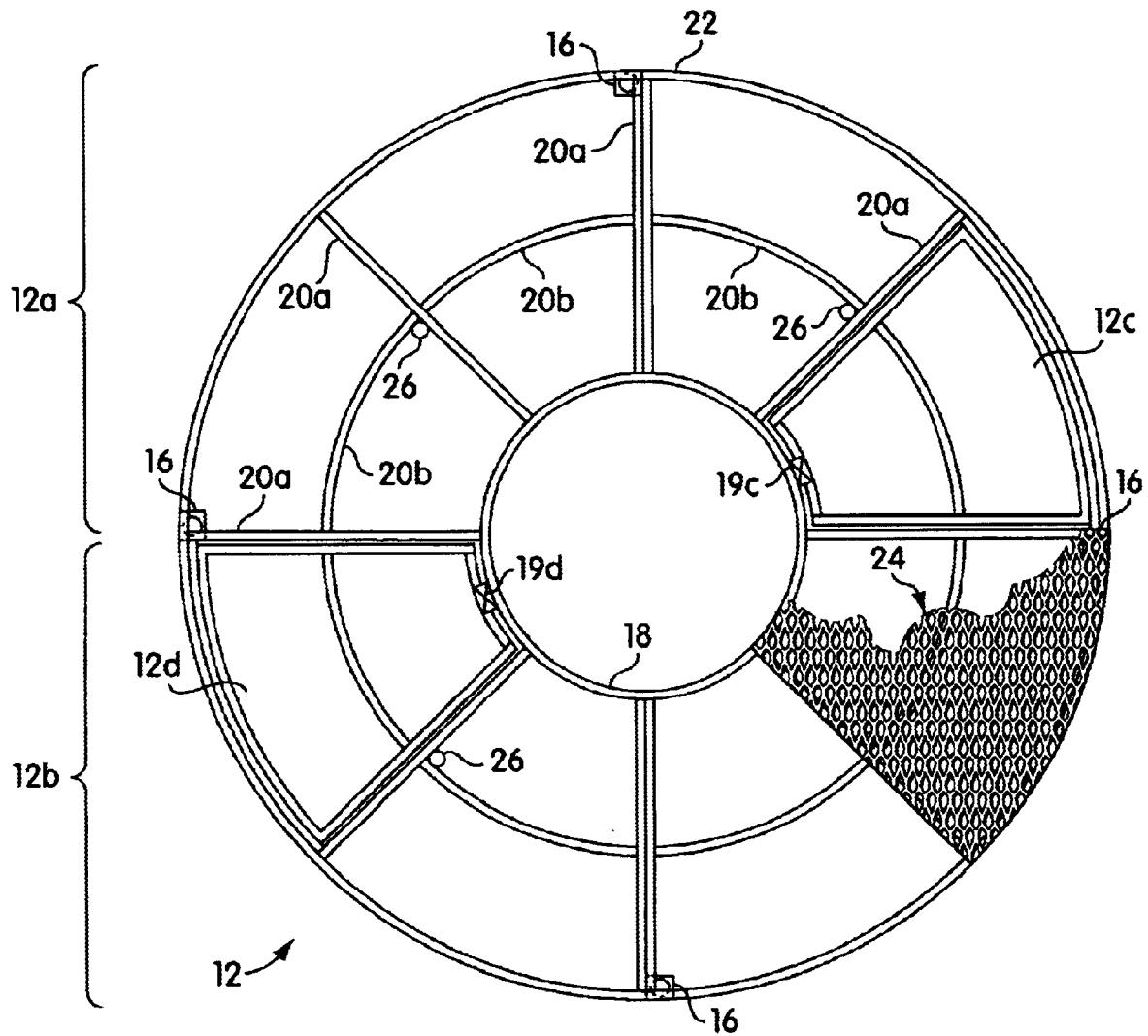
FIG. 2A is a top view of the platform shown in FIG. 1A.
Figure 2B:
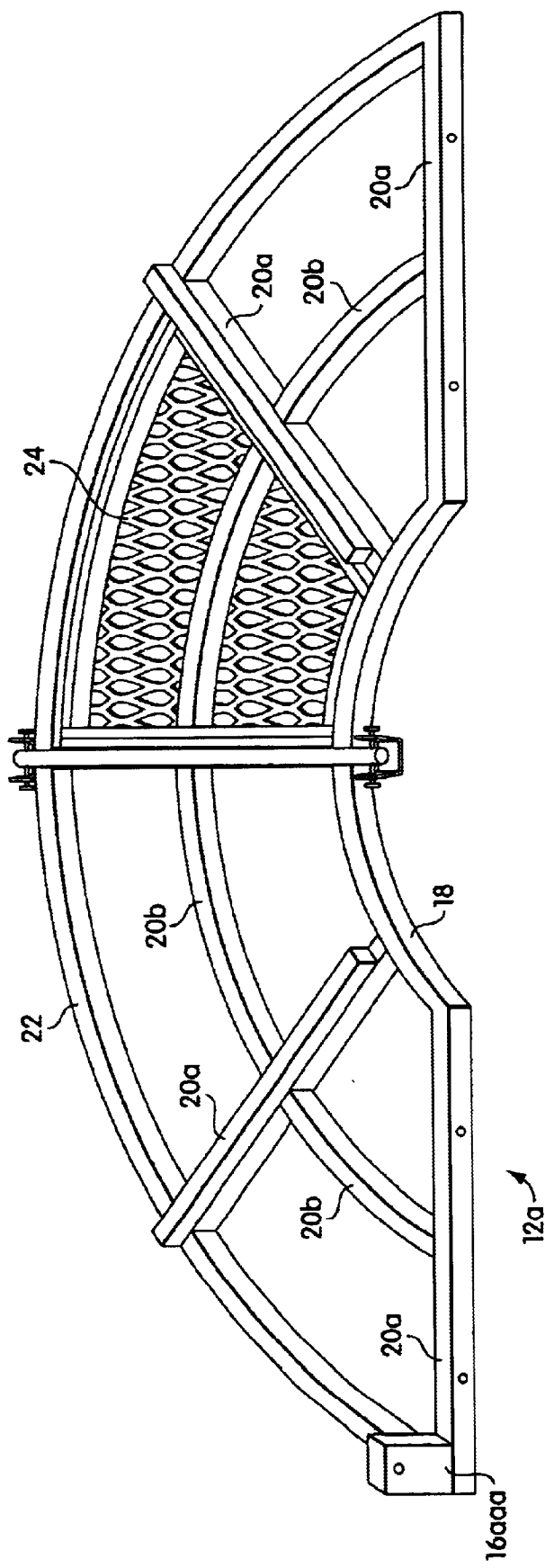
FIG. 2B is a bottom view of the platform shown in FIG. 1A.

An exemplary embodiment of the platform 12 is shown in FIGS. 2A and 2B. As shown in the figures, the platform 12 may include an inner sidewall 18, multiple support ribs 20a, 20b, an outer sidewall 22, and a flooring 24. As shown, the inner sidewall 18 and the outer sidewall 22 may be substantially circular in shape to conform to the shape of the tree trunk 8. Alternately, the inner and outer sidewalls 18, 22 may have a variety of other shapes, and may have the same or different shapes. For example, the inner sidewall 18 may have a substantially oval shape, and the outer sidewall 22 may have a substantially oval shape or a substantially rectangular shape. As also shown, the platform 12 may include radial support ribs 20a that may extend radially between the inner sidewall 18 and the outer sidewall 22. Optionally, as shown, the platform 12 may also include arcuate support ribs 20b that may have, substantially arcuate shapes, to conform to the shapes of the inner and/or outer sidewalls 18, 22. In the shown exemplary embodiment, the radial support ribs 20a and the arcuate support ribs 20b may be welded to each other near the regions of intersection.

As shown in the exemplary embodiment of FIGS. 2A and 2B, the flooring 24 may be disposed on the support ribs 20a, 20b. Optionally, the flooring 24 may be disposed on the support ribs 20a, 20b and on the inner sidewall 18 and/or the outer sidewall 22. In one aspect of the exemplary embodiment, the inner sidewall 18, the support ribs 20a, 20b, and the outer sidewall 22 may be constructed from metal, e.g. aluminum, and the flooring 24 may be constructed from expanded metal, e.g. expanded aluminum. In another aspect of the exemplary embodiment, the flooring 24 may be attached to the platform 12 by welds and/or removeable and replaceable fasteners, for example, dowels, nails, nuts and bolts, screws, spikes, rivets, tacks, and/or other conventional fasteners.

As shown in the exemplary embodiment of FIGS. 2A and 2B, the platform 12 may span a planar angle of up to 360°, and may be constructed from two platform portions 12a, 12b that may be removeably and replaceably attached to each other. As indicated in FIG. 2B, both of the platform portions 12a, 12b may span planar angles of approximately 180°. In one aspect of the exemplary embodiment, the platform portions 12a, 12b may be attached to each other by removeable and replaceable fasteners, such as the fasteners previously described.

A variety of other exemplary embodiments of the platform 12 are possible. For example, in another exemplary embodiment, the platform 12 may include closely spaced support ribs 20a and/or 20b instead of flooring. 24. In one aspect of the exemplary embodiment, the support ribs may be spaced sufficiently close to inhibit falls through the platform 12. Preferably, the platform 12 includes flooring 24 to reduce the weight of the tree stand 10. Also, the components of the platform 12 may be constructed from wood, plastic, or other durable materials. In another exemplary embodiment, the components of the platform 12 may be constructed from plastic formed using a mold. Also, the components of the platform 12 may be constructed from the same or different materials. Further, the flooring 24 may be secured to the platform 12 by an adhesive, such as glue. Further still, the platform 12 may include a single platform portion, e.g. platform portion 12a. Alternately, the platform 12 may span a planar angle between approximately 180° and approximately 360°. Alternately still, the platform 12 may be constructed from two or more platform portions, and the platform portions may span similar or different planar angles.

As shown in the exemplary embodiment of FIG. 2A, the platform 12 has a substantially circular shape. A variety of other shapes are possible for the platform 12. For example, the platform 12 may have the shape of any type of oval, including a circle and an ellipse, the shape of any type of polygon, including a triangle, a parallelogram, a pentagon, a hexagon, a heptagon, and an octagon, and the shape of any type of semi-oval, including a semi-circle.

As shown in the exemplary embodiment of FIG. 2A, the platform 12 may include one or more platform portions 12c, 12d that are hingedly mounted to the inner sidewall 18 by hinges 19c, 19d, respectively. By being hingedly mounted, the platform portions 12c, 12d may be raised and/or lowered relative to the platform 12, thereby facilitating entry to and exit from the tree stand 10. Alternative constructions are possible. For example, one or more platform portions 12c, 12d may be hingedly mounted to the outer sidewall 22. Also, one or more platform portions 12c, 12d may be pivotally mounted to at least one of the inner sidewall 18 and the outer sidewall 22.

As shown in the exemplary embodiment of FIG. 2A, the platform 12 may include one or more external device supports 26. The external device supports 26 may be attached to the inner sidewall 18, the support ribs 20a and/or 20b, the outer sidewall 22, and/or the flooring 24 using schemes previously described, e.g. welds, adhesive, and/or removeable and replaceable fasteners. The external device supports 26 may include hollow tubes shaped for receiving mated connectors. In one exemplary embodiment, the external device supports 26 may be seat supports shaped for receiving removeable and replaceable seats, such as hunting seats. In another exemplary embodiment, the external device supports 26 may be container supports shaped for receiving removeable and replaceable beverage containers, such as styrofoam beverage coolers. In another exemplary embodiment, the external device supports 26 may be holders for hunting equipment and other types of equipment, such as cameras. In another exemplary embodiment, the external device supports 26 may be supports for a roof or a shade. In another exemplary embodiment, the external device supports 26 may be supports for a hunting blind.

As shown in the exemplary embodiment of FIGS. 1A and 1B, the platform 12 may include multiple second receiving portions 39 for removeably and replaceably receiving the multiple support bars 38, thereby supporting, with the first receiving portions 36, the platform 12 on the tree trunk 8. As shown, the second receiving portions 39 may be substantially planar, and may radially extend in a plane that is substantially parallel to the plane of the platform 12. As shown, the platform 12 may include a lower surface 61 facing the collar 14, and the second receiving portions 39 may include metal tubes welded to the lower surface 61. Alternately, the second receiving portions 39 may be removeably and replaceably attached to the lower surface 61 using previously described schemes, e.g. removeable and replaceable fasteners.

In one aspect of the exemplary embodiment, the second receiving portions 39 may be fabricated by suitably modifying the schemes described herein for fabricating the first receiving portions 36.

Apart from the features shown in the exemplary embodiments of FIGS. 1A, 1B, 2A and 2B, the platform 12 may optionally include a variety of other useful features. For example, in one exemplary embodiment, the platform 12 may include a safety railing to inhibit falls from the platform 12. The safety railing may be removeably and replaceably attached to the platform 12 near the outer sidewall 22 using schemes previously described, e.g. welds, adhesive, removeable and replaceable fasteners, and/or ratchet straps. Also, in another exemplary embodiment, the platform 12 may include an access ladder facilitating access to the tree stand 10. The access ladder may be removeably and replaceably attached to the platform 12 near the hingedly or pivotally mounted portions 12c, 12d using schemes previously described, e.g. welds, adhesive, removeable and replaceable fasteners, and/or ratchet straps. Alternately, the access ladder may be attached to the platform 12 and/or the tree trunk 8. Further, as indicated above, in various exemplary embodiments, the platform 12 may include a hunting blind and/or supports for a roof. The hunting blind and/or roof supports may be removeably and replaceably attached to the platform 12 near the outer sidewall 22 using schemes previously described, e.g. welds, adhesive, removeable and replaceable fasteners, and/or ratchet straps.

Figure 3A:
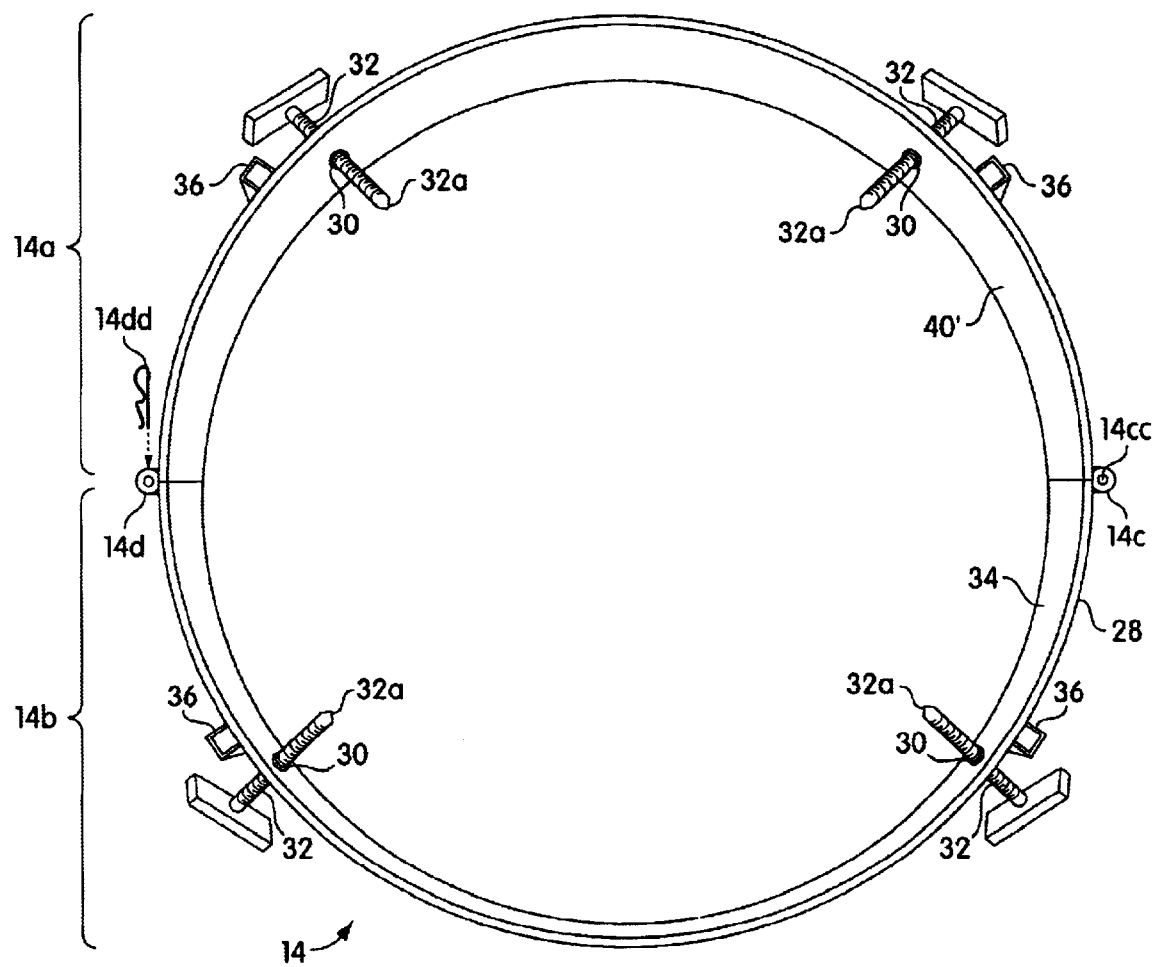
FIG. 3A is a top view of the collar shown in FIG. 1A.
Figure 3B:
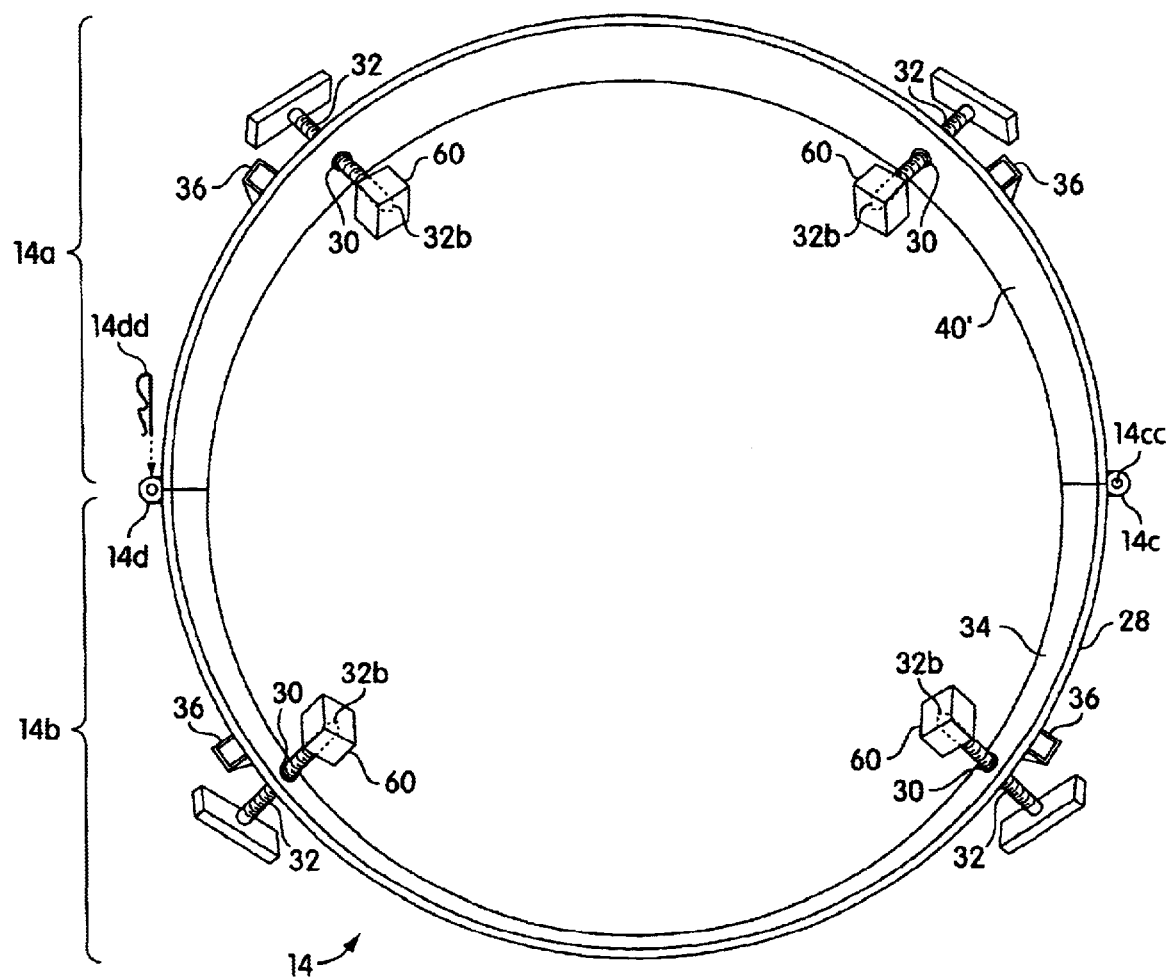
FIG. 3B is a top view of another exemplary embodiment of the collar shown in FIG. 1A.
Figure 3C:
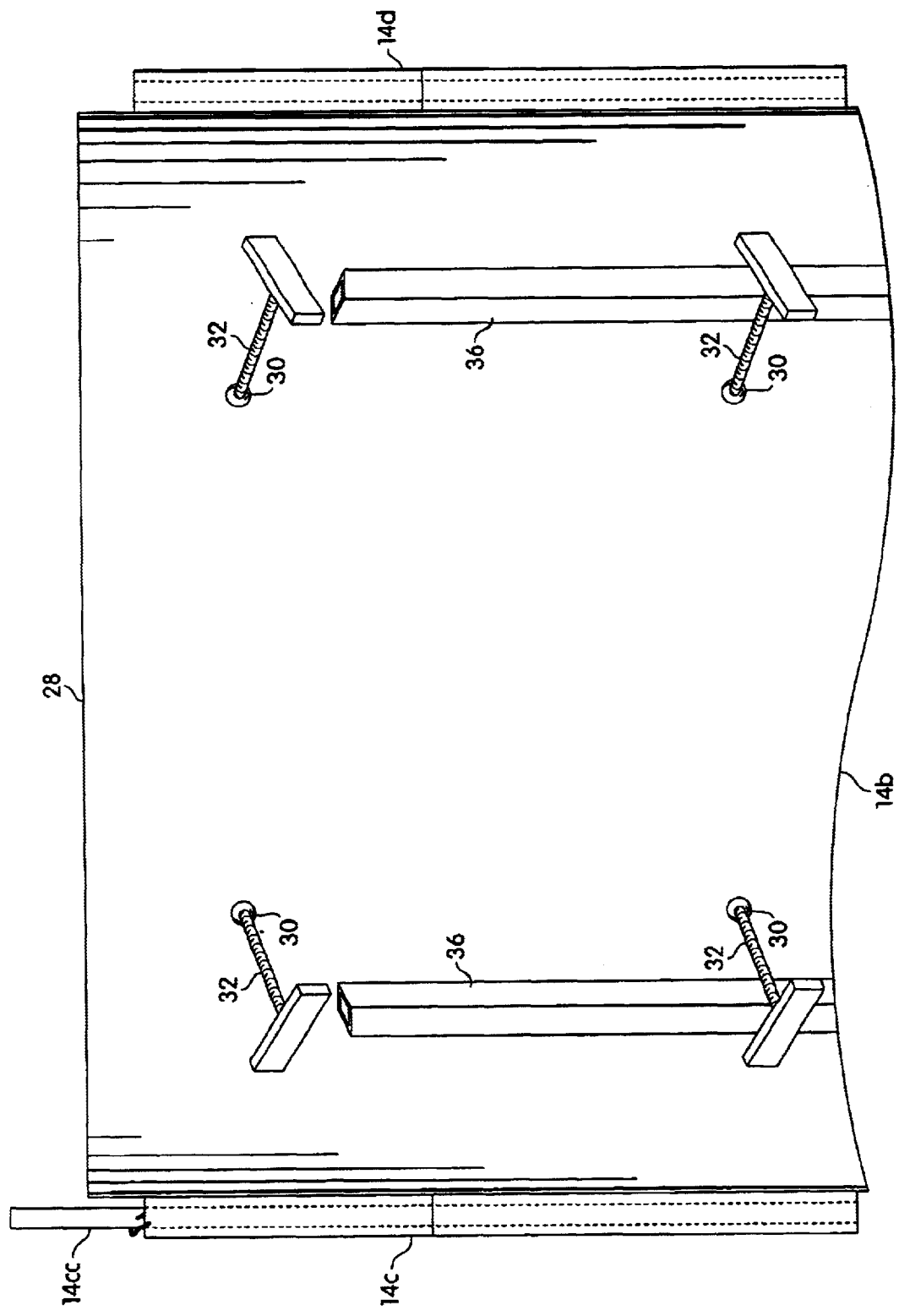
FIG. 3C is a side view of the collar shown in FIG. 1A.

An exemplary embodiment of the collar 14 is shown in FIGS. 3A and 3C. As shown in FIG. 3A, the collar 14 may be constructed from two collar portions 14a, 14b that may be removeably and replaceably attached to each other. As shown in FIGS. 3A and 3C, the two collar portions may be hingedly attached to each other at a first end 14c by a hinge 14cc and releasably fastened to each other at a second end 14d by a pin 14dd. By being hingedly attached at the first end 14c, the collar portions 14a, 14b may be opened and closed to accommodate tree trunks 8 having a wide variety of diameters. As shown in FIG. 3A, the collar 14 may be substantially cylindrical in shape to conform to the shape of the inner sidewall 18 and the tree trunk 8. Alternately, the collar 14 may have a variety of other shapes, and may have a shape that is the same as or similar to the shape of the inner sidewall 18 and/or the tree trunk 8. For example, the collar 14 may have an annular shape with a substantially oval cross-section, a substantially circular cross-section, or another cross-section. In one aspect of the exemplary embodiment, the collar 14 may be constructed from metal, e.g. aluminum.

As shown in the exemplary embodiment of FIG. 3A, the collar portions 14a, 14b may have substantially hemi-cylindrical shapes with arcuate cross-sections. Alternately, the collar portions 14a, 14b may have a variety of other shapes. For example, the collar portions 14a, 14b may have different circumferences, in which a collar portion 14a, 14b may comprise more, or less, than half of the circumference of the collar 14. As shown in FIGS. 1A and 3A, the collar 14 may include a central axis that is substantially perpendicular to the plane of the platform 12 and substantially parallel to the vertical axis of the tree trunk 8. As also shown in FIGS. 1A and 3A, the central axis of the collar 14 and the vertical axis of the tree trunk 8 may be coaxial.

As shown in the exemplary embodiment of FIGS. 3A and 3C, the collar 14 may include an outer surface 28 facing away from the tree trunk 8, multiple apertures 30 extending radially inward from the outer surface 28, and mated fasteners 32 having angled faces 32a for removeably and replaceably attaching the collar 14 to the tree trunk 8. In one aspect of the exemplary embodiment, the apertures 30 may be threaded, and the fasteners 32 may be T-handle screws that may be screwed into the tree trunk 8. Alternately, the apertures 30 may be threaded or unthreaded, and the fasteners 32 may be dowels, nails, nuts and bolts, screws, spikes, rivets, tacks, and/or other conventional fasteners that may be driven into the tree trunk 8.

Another exemplary embodiment of the collar 14 is shown in FIG. 3B. As shown in the exemplary embodiment of FIG. 3B, the collar 14 may include multiple apertures 30, an inner surface 34 facing the tree trunk 8, multiple nuts 60 that surround the multiple apertures 30 and that are welded to the inner surface 34, and mated fasteners 32 having blunt faces 32b for removeably and replaceably attaching the collar 14 to the tree trunk 8. Alternately, the nuts 60 may be removeably and replaceably attached to the inner surface 34 by using schemes described previously, for example, removeable and replaceable fasteners. In one aspect of the shown exemplary embodiment, the apertures 30 and the mated fasteners 32 may be threaded. In another aspect of the shown exemplary embodiment, the apertures 30 may be disposed at substantially equidistant intervals around the outer surface 28 of the collar 14, and the fasteners 32 may be removeably and replaceably inserted through the apertures 30 and the nuts 60 until the blunt faces 32b press against the tree trunk 8. In the shown exemplary embodiment, the pressure exerted by the tree trunk 8 against the blunt faces 32b supports the collar 14 on the tree trunk 8. In the shown exemplary embodiment, the collar 14 may be attached to the tree trunk 8 without penetrating the tree trunk 8. In the shown exemplary embodiment, the multiple nuts 60 inhibit the mated fasteners 32 from detaching or pulling away from the tree trunk 8. In the shown exemplary embodiment, the fasteners 32 may be T-handled screws having blunt faces 32b. A variety of other apertures 30 and fasteners 32 are also possible. For example, the apertures 30 and the fasteners 32 may be threaded or unthreaded, and the fasteners 32 may be fasteners having blunt faces 32b.

A variety of other constructions are possible for the collar 14. For example, the collar 14 may be constructed from another material, such as plastic formed by using a mold, or any of the other materials previously described. Also, the collar 14 may include only a single collar portion, e.g. collar portion 14b. Also, the collar 14 may be constructed from two or more collar portions, the collar portions may have similar or different circumferences, and the collar portions may be removeably and replaceably attached to each other using schemes described previously, e.g. welds and/or removeable and replaceable fasteners, such as clamps, ratchet straps, and pins.

A variety of other mechanisms for supporting the collar 14 on the tree trunk 8 are also possible. For example, the inner surface 34 of the collar 14 may have teeth extending inward from the inner surface 34 for removeably and replaceably attaching the collar 14 to the tree trunk 8. Alternately, the collar 14 may be removeably and replaceably attached to the tree trunk 8 by tightening a ratchet strap through the apertures 30.

As shown in the exemplary embodiment of FIGS. 3A, 3B, and 3C, the collar 14 may include multiple first receiving portions 36 for removeably and replaceably receiving the multiple support bars 38, thereby supporting the platform 12 on the tree trunk 8. In one aspect of the exemplary embodiment, the first receiving portions 36 may include metal tubes welded to at least one of the outer surface 28 and the inner surface 34 of the collar 14. Alternately, the first receiving portions 36 may be removeably and replaceably attached to at least one of the outer surface 28 and the inner surface 34 of the collar 14 using previously described schemes, e.g. removeable and replaceable fasteners. As shown in FIGS. 3A, 3B, and 3C, the first receiving portions 36 may extend in a direction substantially parallel to the central axis of the collar 14 and substantially parallel to the vertical axis of the tree trunk 8.

In the exemplary embodiment shown in FIGS. 3A, 3B, and 3C, the multiple first receiving portions 36 include metal tubes having substantially rectangular cross sections when viewed in a direction substantially perpendicular to the plane of the platform 12. Alternately, the multiple first receiving portions 36 may have a variety of cross-sections when viewed in a direction substantially perpendicular to the plane of the platform 12. For example, the multiple first receiving portions 36 may have substantially polygonal, oval, or semi-oval cross sections.

In the exemplary embodiment shown in FIG. 3C, the multiple first receiving portions 36 include substantially vertically contiguous metal tubes. Alternately, a first receiving portion 36 may include multiple separate metal tubes that are disposed substantially vertically with respect to each other. The multiple separate metal tubes may be individually attached to at least one of the outer surface 28 and the inner surface 34 of the collar 14 using previously described schemes, e.g. welds, adhesives, and/or removeable and replaceable fasteners.

In the exemplary embodiment shown in FIG. 3C, the multiple first receiving portions 36 include substantially circumferentially contiguous metal tubes. Alternately, a first receiving portion 36 may include a partially open tube. For example, a first receiving portion 36 may include a U-shaped tube when viewed in a direction substantially perpendicular to the plane of the platform 12.

A variety of other constructions of the first receiving portions 36 are possible. For example, as partially shown in FIG. 3A, the collar 14 may include an upper surface 40 facing the platform 12, and the first receiving portions 36 may include apertures in the collar 14 extending substantially downward from the upper surface 40. The apertures may have a substantially polygonal, oval, or semi-oval cross-section when viewed in a direction substantially perpendicular to the plane of the platform 12.

As described above with reference to FIG. 2A, the platform 12 may include one or more external device supports 26. Alternately, as described below, the collar 14 may include one or more external device supports 29.

Figure 3D:
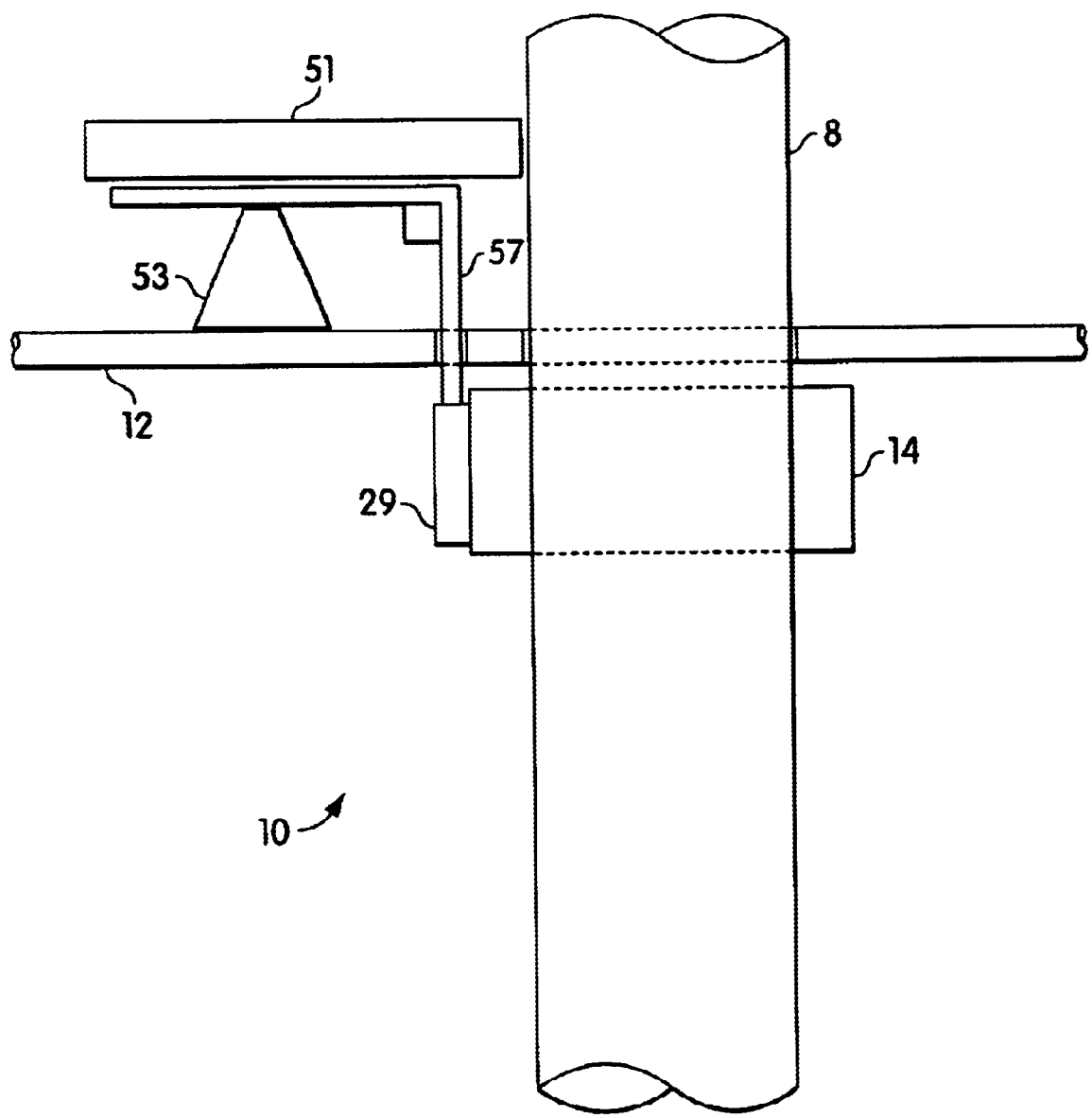
FIG. 3D is a partial side view of the tree stand shown in FIG. 1A, illustrating another exemplary embodiment of the collar shown in FIG. 1A.

Another exemplary embodiment of the collar 14 is shown in FIG. 3D. As shown in the figure, the collar 14 may include one or more external device supports 29, and the tree stand 10 may further include one or more external device support beams 57 that may be removeably and replaceably inserted into the external device supports 29. As also shown, the tree stand 10 may include one or more external device support blocks 53. As further shown, the external device support blocks 53 and the external device support beams 57 may support one or more external devices 51. Optionally, the external device 51 may include one or more device receiving portions for removeably and replaceably receiving the support beams 57, thereby supporting, with the external device supports 29, the external device 51. The device receiving portions may be fabricated by suitably modifying the schemes described herein for fabricating the first receiving portions 36, second receiving portions 39, and/or external device supports 29.

In the shown exemplary embodiment, the external device 51 may include a seat. Alternately, the external device 51 may include a surface for supporting objects, e.g. hunting items. Potentially advantageously, the external device 51 may be disposed near the tree trunk 8, thereby permitting a seated observer to recline against the tree trunk 8.

In one aspect of the exemplary embodiment, the external device supports 29 may be fabricated and attached to the collar 14 by suitably modifying schemes described herein for fabricating and attaching the multiple first receiving portions 36 to the collar 14. The external device supports 29 may be attached to the collar 14 near the first and/or second ends 14c, 14d of the collar 14. Potentially advantageously, locating the external device supports 29 near the first and/or second ends 14c, 14d of the collar 14 may strengthen the collar 14 by providing additional support near the attachment of the collar portions 14a, 14b.

In another aspect of the exemplary embodiment, the external device support beams 57 may be fabricated by suitably modifying schemes described herein for fabricating the support bars 38.

In another aspect of the exemplary embodiment, the external device support block 53 may have a substantially triangular shape to provide support for the external device 51. Alternately, the external device support block 53 may have a variety of other shapes. For example, the external device support block 53 may have the shape of any type of polygon, for example, a square, a rectangle, and a parallelogram. The external device support block 53 may be constructed from a variety of materials. For example, the external device support block 53 may be constructed from metal, e.g. aluminum, wood, or plastic formed by using a mold.

An exemplary embodiment of a support bar 38 is shown in FIG. 4. As shown in the figure, the support bar 38 may have an L-shape and may include a base 38a and an elongated portion 38b oriented substantially perpendicular to the base 38a. As shown in FIG. 1B, the base portion 38a may be oriented substantially perpendicular to the plane of the platform 12, and the elongated portion 38b may radially extend outward from the collar 14 along the lower surface 61 of the platform 12. In one aspect, the elongated portion 38b may be sized and shaped to span the platform 12 between the inner and outer sidewalls 18, 22. As shown in FIGS. 1B and 4, the support bar 38 may include a reinforcement portion 40 providing reinforcement for the elongated portion 38b. In one aspect of the exemplary embodiment, the support bar 38 may be constructed from metal, e.g. aluminum.

As shown in the exemplary embodiment of FIG. 1A, the multiple support bars 38 may be disposed along the lower surface 61 of the platform 12 and may be removeably and replaceably inserted into the first receiving portions 36 and, optionally, the second receiving portions 39, thereby supporting the platform 12 on the collar 14.

A variety of other constructions are possible for the first receiving portions 36, the second receiving portions 39, and the support bars 38. For example, the first receiving portions 36, the second receiving portions 39, and the support bars 38 may be constructed from other materials, such as wood and/or plastic that may be formed by using a mold. Also, the support bars 38 may include extendable portions that may be extended to a desired length to support platforms 12 having different sizes.

As described previously, the tree stand 10 may optionally include multiple support legs 16 further supporting the platform 12 on the tree trunk 8.

An exemplary embodiment of a support leg 16 is shown in FIG. 5. As shown in FIGS. 1A, 1B, 2A, 2B, and 5, the support leg 16 may be removeably and replaceably attached at a first end 16a to the platform 12 at first mount 16aaa. The support leg 16 may be attached to the first mount 16aaa by using schemes previously described, e.g. welds, adhesive, removeable and replaceable fasteners, and/or ratchet straps. For example, as indicated in FIGS. 1B, 2B and 5, the support leg 16 may be pivotally attached at eyelet 16aa to first mount 16aaa.

As shown FIGS. 1A, 1B, and 5, the support leg 16 may be removeably and replaceably attached at a second end 16b to the tree trunk 8. The support leg 16 may include a second mount 16bbb facilitating attachment of the support leg 16 to the tree tree 8. As shown, the support leg may be pivotally attached at eyelet 16bb to second mount 16bbb, and the second mount 16bbb may be attached to the tree trunk 8 using schemes previously described, e.g. nails, screws, spikes, tacks, ratchet straps, and/or other conventional fasteners.

A variety of other schemes may also be used to attach the support leg 16 to the tree trunk 8. For example, as suggested in FIG. 5, the support leg 16 may be attached to a tree trunk by inserting a ratchet strap through eyelets 16bb, and then tightening the ratchet strap around the tree trunk.

In one aspect of the exemplary embodiment, the support leg 16 may be constructed from metal, e.g. aluminum.

A variety of other constructions of the support legs 16 are possible. For example, the support legs 16 may be attached at first ends 16a to the platform 12 at locations between the outer sidewall 22 and the inner sidewall 18. Also, the support legs 16 may be attached to the support ribs 20a and/or 20b and/or the flooring 24. Also, the support legs 16 can be constructed from other materials, such as wood and/or plastic formed by using a mold. Also, the support legs 16 may include portions of expanded metal flooring disposed near the second ends 16b to facilitate attachment of the second ends 16b to the tree trunk 8. The portions of expanded metal flooring may be attached to the second ends 16b by using schemes described previously, e.g. welds, adhesive, and/or removeable and replaceable fasteners. In one aspect, the portions of expanded metal flooring may be disposed substantially between the second mounts 16bbb and the tree trunk 8. In this exemplary embodiment, penetration of the tree trunk 8 by the portions of expanded metal flooring may facilitate attachment of the support legs 16 to the tree trunk 8.

As suggested by the previous discussion, the exemplary tree stand 10 may be removeably and replaceably attached to the tree trunk 8 by attaching the collar 14 to the tree trunk 8, sliding the support bars 38 into the first receiving portions 36, disposing one or more platform portions 12a, 12b on the support bars 38, attaching platform portions 12a and 12b together, and, optionally, attaching support legs 16 to the platform 12 and the tree trunk 8.

As also suggested by the previous discussion, attaching the collar 14 to the tree trunk 8 may include adjusting the size of the collar 14 around the tree trunk 8 at a preliminary height, inserting fasteners 32 having blunt faces 32b through the apertures 30 to loosely attach the collar 14 to the tree trunk at the preliminary height, raising the collar 14 from the preliminary height and selectively adjusting the position of the fasteners 32, and then tightening the fasteners 32 to the tree trunk 8 at a desired height.

While the tree stands disclosed herein have been particularly shown and described with reference to the exemplary embodiments thereof, those of ordinary skill in the art will understand that various changes may be made in the form and details .herein without departing from the spirit and scope of the disclosure. Those of ordinary skill in the art will recognize or be able to ascertain many equivalents to the exemplary embodiments described specifically herein by using no more than routine experimentation. Such equivalents are intended to be encompassed by the scope of the present disclosure and the appended claims.

What is claimed is:

1. A tree stand comprising:
   a platform,
   a substantially cylindrical collar being removeably and replaceably attachable to a tree trunk, the collar including an inner surface adapted to face towards the tree trunk, an outer surface adapted to face away from the tree trunk, and multiple first receiving portions disposed on at least one of the inner surface and the outer surface of the collar, and
   multiple support bars supporting the platform on the collar, at least one of the multiple support bars being removeably and replaceably insertable into at least one of the multiple first receiving portions, at least one portion of the at least one of the multiple support bars being removeably and replaceably positionable within the at least one of the multiple first receiving portions, at least one of the multiple support bars being removeably and replaceably receivable within at least one portion of the platform.

2. The tree stand of claim 1, wherein the platform spans a planar angle of at least approximately 180°.

3. The tree stand of claim 1, wherein the platform spans a planar angle of approximately 360°.

4. The tree stand of claim 1, wherein the platform includes at least two portions being removeably and replaceably attachable to each other.

5. The tree stand of claim 1, wherein the platform includes an inner sidewall adapted to face the tree trunk, an outer sidewall adapted to face away from the tree trunk, and at least one portion of the platform being pivotally mountable to at least one of the inner sidewall and the outer sidewall.

6. The tree stand of claim 1, wherein the platform includes multiple support ribs and expanded metal flooring disposed on the multiple support ribs.

7. The tree stand of claim 1, wherein the platform includes multiple second receiving portions, at least one of the multiple support bars being removeably and replaceably insertable into at least one of the multiple second receiving portions.

8. The tree stand of claim 7, wherein at least one of the multiple support bars has an L-shape including a base and an elongated portion oriented substantially perpendicular to the base, the base being removeably and replaceably insertable into at least one of the multiple first receiving portions, the elongated portion being removeably and replaceably insertable into at least one of the multiple second receiving portions.

9. The tree stand of claim 1, wherein the collar includes two collar portions being removeably and replaceably attachable to each other.

10. The tree stand of claim 9, wherein the two collar portions are hingedly attachable at a first end and releasably fastenable at a second end.

11. The tree stand of claim 9 wherein the two collar portions have substantially hemi-cylindrical shapes.

12. The tree stand of claim 1, wherein the collar includes multiple apertures extending inward from the outer surface and multiple mated fasteners for removeably and replaceably attaching the collar to the tree trunk.

13. The tree stand of claim 12, wherein at least one of the multiple mated fasteners includes a blunt face adapted to face the tree trunk.

14. The tree stand of claim 12, wherein the apertures are disposed at substantially equidistant intervals around the collar.

15. The tree stand of claim 12, wherein the collar further includes an inner surface adapted to face the tree trunk, and multiple nuts attached to the inner surface and surrounding the multiple apertures.

16. The tree stand of claim 15, wherein at least one of the multiple nuts is welded to the inner surface of the collar.

17. The tree stand of claim 1, wherein the multiple first receiving portions include multiple tubes disposed on the outer surface.

18. The tree stand of claim 17, wherein at least one of the multiple tubes is welded to the outer surface of the collar.

19. The tree stand of claim 1, wherein at least one of the multiple support bars includes an L-shape including a base and an elongated portion oriented substantially perpendicular to the base, the base being removeably and replaceably insertable into at least one of the multiple first receiving portions.

20. The tree stand of claim 1, wherein the tree stand further includes multiple support legs, at least one of the multiple support legs being pivotally mountable at a first end to the platform.

21. The tree stand of claim 20, wherein at least one of the multiple support legs is removeably and replaceably attachable at a second end to the tree trunk.

22. A tree stand comprising:
a platform that spans a planar angle of approximately 360°,
a collar being removeably and replaceably attachable to a tree trunk, the collar including multiple receiving tubes, at least one of the multiple receiving tubes being welded to an outer surface of the collar, the outer surface adapted to face away from the tree trunk, and
multiple support bars supporting the platform on the collar, at least one of the multiple support bars having an L-shape including a base and an elongated portion oriented substantially perpendicular to the base, the base being removeably and replaceably insertable into at least one of the multiple receiving tubes, the elongated portion being removeably and replaceably receivable within at least one portion of the platform.

23. A tree stand comprising:
a platform,
a collar being removeably and replaceably attachable to a tree trunk, the collar including an outer surface adapted to face away from the tree trunk and multiple tubes disposed on the outer surface, and
multiple support bars supporting the platform on the collar, at least one of the multiple support bars being removeably and replaceably insertable into at least one of the multiple tubes, at least one portion of the at least one of the multiple support bars being removeably and replaceably positionable within the at least one of the multiple tubes, at least one of the multiple support bars being removeably and replaceably receivable within at least one portion of the platform.

24. A tree stand comprising:
a platform,
a collar being removeably and replaceably attachable to a tree trunk, the collar including multiple first receiving portions, the collar further including two collar portions that are hingedly attachable at a first end and releasably fastenable at a second end, and
multiple support bars supporting the platform on the collar, at least one of the multiple support bars being removeably and replaceably insertable into at least one of the multiple first receiving portions, at least one portion of the at least one of the multiple support bars being removeably and replaceably positionable within the at least one of the multiple first receiving portions, at least one of the multiple support bars being removeably and replaceably receivable within at least one portion of the platform.

25. A tree stand comprising:
a platform,
a collar being removeably and replaceably attachable to a tree trunk, the collar including multiple first receiving portions,
multiple support bars supporting the platform on the collar, at least one of the multiple support bars being removeably and replaceably insertable into at least one of the multiple first receiving portions, at least one portion of the at least one of the multiple support bars being removeably and replaceably insertable into the at least one of the multiple first receiving portions, at least one of the multiple support bars being removeably and replaceably receivable within at least one portion of the platform, and
multiple support legs, at least one of the multiple support legs being pivotally mountable at a first end to the platform and removeably and replaceable attachable at a second end to the tree trunk.

* * * * *